United States Patent [19]
Brauer et al.

[11] Patent Number: 5,528,496
[45] Date of Patent: * Jun. 18, 1996

[54] VEHICLE ALIGNMENT SYSTEM AND METHOD INCORPORATING DIGITAL PHOTOGRAPH DATABASE OF VEHICLES

[75] Inventors: Stephen F. Brauer, Ladue; Timothy A. Strege, Maryland Heights, both of Mo.

[73] Assignee: Hunter Engineering Company, Bridgeton, Mo.

[*] Notice: The portion of the term of this patent subsequent to Jul. 15, 2013, has been disclaimed.

[21] Appl. No.: 55,638

[22] Filed: Apr. 29, 1993

[51] Int. Cl.⁶ .................................................. G06F 17/30
[52] U.S. Cl. ................................ 364/424.03; 395/161
[58] Field of Search ..................... 364/424.03, 424.04, 364/551.01, 550, 506, 552, 559; 395/153, 154, 155, 600; 434/373, 374, 375

[56] References Cited

U.S. PATENT DOCUMENTS

| | | | |
|---|---|---|---|
| 4,899,292 | 2/1990 | Montagna et al. | 364/521 |
| 4,977,524 | 12/1990 | Strege et al. | 364/562 |
| 4,985,848 | 1/1991 | Pfeiffer et al. | 364/518 |
| 5,128,859 | 7/1992 | Carbone et al. | 364/401 |
| 5,241,671 | 8/1993 | Reed et al. | 395/600 |
| 5,272,769 | 12/1993 | Strnatka et al. | 395/161 |
| 5,414,626 | 5/1995 | Boorse et al. | 364/424.03 |
| 5,432,904 | 7/1995 | Wong | 395/161 |
| 5,442,549 | 8/1995 | Larson | 364/424.01 |

OTHER PUBLICATIONS

Hunter Engineering Company, "System H111 New Laser Video Disk Option," Oct. 1990, all, U.S.
FMC Automotive Service Equip. Div., "FMC John Bean Visualiner Series," unknown date, particularly last page, U.S.

*Primary Examiner*—Michael Zanelli
*Attorney, Agent, or Firm*—Polster, Lieder, Woodruff & Lucchesi

[57] ABSTRACT

A vehicle alignment system for inspecting and adjusting alignment of the suspension of numerous different vehicle models includes manually operable switches for selecting a particular vehicle model, a CD-ROM for storing a number of digital photographs depicting actual wear and adjustment points of different actual vehicle models, a display for displaying digital photographs, and a controller which responds to the selection of a particular vehicle model for providing, if available, at least one of the stored digital photographs for that particular vehicle model to the display for display. A method of operating alignment apparatus for inspecting the suspensions of numerous different vehicle models includes selecting a particular vehicle model to be inspected, displaying as a digital image a digital photograph of at least one actual wear or adjustment point of the actual vehicle model selected, and displaying on the digital image visual indicia of a plurality of predetermined inspection points for that portion of the suspension of the selected vehicle model. A method of operating alignment apparatus for adjusting the suspensions of numerous different vehicle models includes selecting a particular vehicle model having a suspension to be adjusted, displaying a digital photograph of the portion of the suspension of the vehicle model under test which may require adjustment, displaying adjustment instructions on the digital photograph, and following the displayed adjustment instructions to adjust the suspension if necessary.

17 Claims, 5 Drawing Sheets

VEHICLE ALIGNMENT SYSTEM AND METHOD INCORPORATING DIGITAL PHOTOGRAPH DATABASE OF VEHICLES

BACKGROUND OF THE INVENTION

The present invention relates to vehicle inspection and adjustment, and more particularly to facilitating the inspection and adjustment of vehicle components relating to vehicle suspension and steering.

Vehicle suspension and steering components are subject to wear and failure. It is necessary, as a result, to inspect and adjust these components periodically to maintain the vehicle suspension and steering in satisfactory condition. This inspection and adjustment is typically performed by a technician who must perform these tasks on a wide variety of different makes and models of vehicles. Since the wear points and adjustment points on these different makes and models typically differ from model to model and make to make, it is extremely difficult for any one technician to have sufficient knowledge to satisfactorily inspect and adjust more than a fraction of the vehicles encountered. Books are available to guide the technician through the inspection and adjustment processes, but the books are bulky, are easily soiled, and generally are not a satisfactory solution.

Various manufacturers of vehicle alignment equipment have attempted to address these difficulties and assist the technicians by providing certain aids as part of the alignment equipment, but these prior art approaches could be improved. For example, one manufacturer displays a stick-figure or animation sequence to the technician to guide the adjustment process. These animation sequences are stored on CD-ROM (compact disk read only memory), but they lack sufficient detail to adequately help the technician and are not specific to particular models of vehicles. Moreover, it is sometimes difficult with the animation sequence for the technician to accurately determine the part on the actual vehicle which is being worked on which corresponds to the part or parts illustrated in the animation sequence. In addition, it takes five to ten seconds before the animation sequence begins to be displayed.

At least one manufacturer has addressed the difficulty of lack of sufficient detail by providing actual photographs of vehicle suspensions and steering mechanisms. These actual photographs are stored on a video laser disk, which means that retrieval for display can take up to nine or ten seconds per photograph, which is longer than could be desired. In addition, the photographs are not specific to particular vehicle models on the whole. Instead, a single photograph may be used for a number of related, but different models. As a result, the technician can be at times unsure if the inspection or adjustment is being performed properly. In addition, the photographs displayed using this system are analog, and making the master for these disks is relatively expensive. Moreover, the video laser disk player is also relatively expensive and fragile.

SUMMARY OF THE INVENTION

Among the various objects and features of the present invention are assisting the vehicle technician in performing inspection and adjustment of vehicle suspensions and steering systems.

A second object is the provision of an improved system for inspecting and adjusting vehicle suspensions and steering systems which accurately depicts suspensions and steering systems for a relatively large number of different makes and models of vehicles.

A third object is the provision of such a system which reduces the amount of knowledge required of the technician.

A fourth object is the provision of such a system which reduces technician uncertainty.

A fifth object is the provision of such a system which provides increased detail for specific makes and models of vehicles.

A sixth object is the provision of such a system which has improved retrieval times.

A seventh object is the provision of such a system which is relatively inexpensive when compared with prior systems.

Other objects will be in part apparent and in part pointed out hereinafter.

Briefly, a vehicle alignment system of the present invention is directed to inspecting and adjusting alignment of the suspension of numerous different vehicle makes and models. The system includes manually operable selection devices for selecting a particular vehicle model to be inspected and adjusted. It also includes a storage device for storing a number of digital photographs depicting actual wear and adjustment points of different actual vehicle models, and a display device for displaying digital photographs. A controller is responsive to the selection of a particular vehicle model by the selecting means for providing, if available, at least one of the stored digital photographs for that particular vehicle model to the display means for display.

A method of the present invention is directed to operating alignment apparatus for inspecting the suspensions of numerous different vehicle models. The method includes the steps of selecting from a plurality of vehicle models a particular vehicle model to be inspected, displaying as a digital image a digital photograph of at least one actual wear or adjustment point of the actual vehicle model selected, and displaying on the digital image visual indicia of a plurality of predetermined inspection points for that portion of the suspension of the selected vehicle model.

In another aspect, a method of the present invention is directed to operating alignment apparatus for adjusting the suspensions of numerous different vehicle models. It includes the steps of selecting from a plurality of vehicle models a particular vehicle model having a suspension to be adjusted, displaying a digital photograph of the portion of the suspension of the vehicle model under test which may require adjustment, displaying adjustment instructions on the digital photograph, and following the displayed adjustment instructions to adjust the suspension if necessary.

BRIEF DESCRIPTION OF THE DRAWINGS

Similar reference characters indicate similar parts throughout the several views of the drawings.

DESCRIPTION OF THE PREFERRED EMBODIMENT

Figure 1:
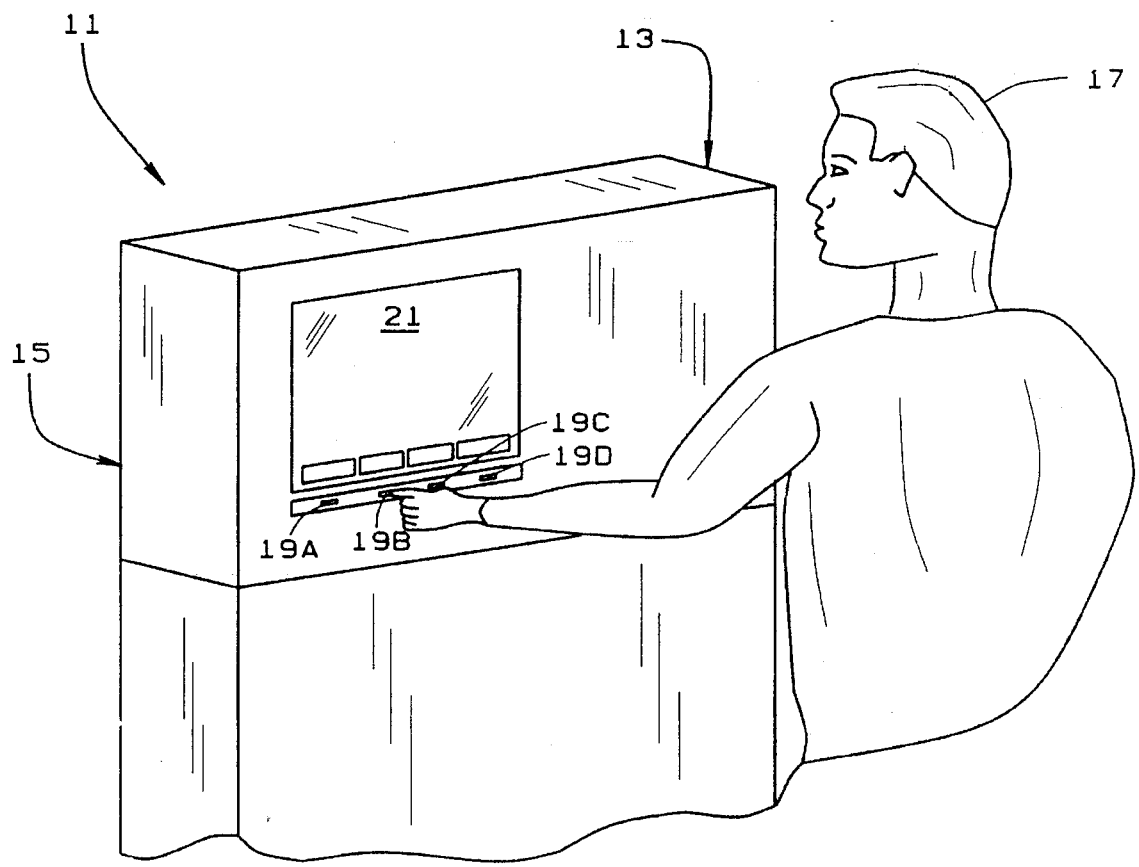
FIG. 1 is a perspective view of a vehicle alignment system console of the present invention with a technician/user.
Figure 2:
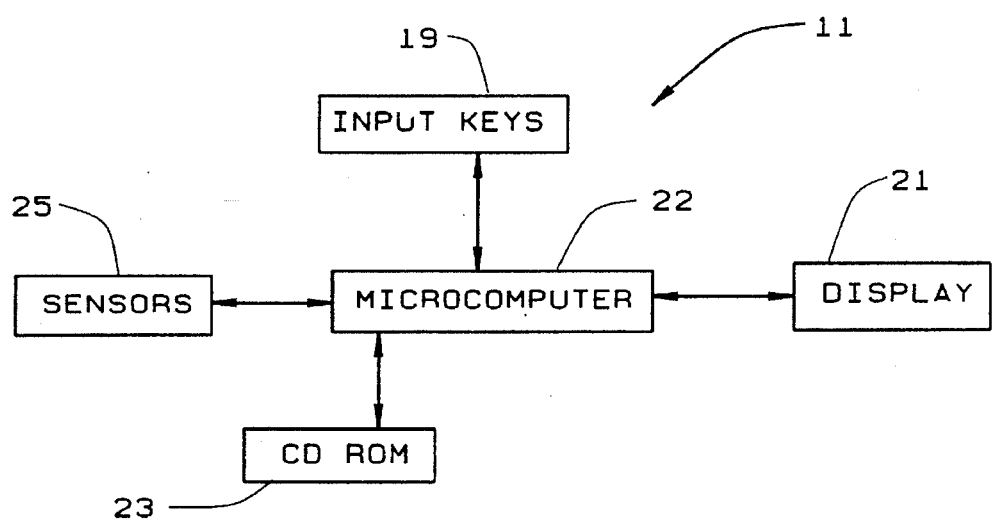
FIG. 2 is a block-diagram of the circuitry of the system of FIG. 1.

Turning to the drawings, and more particularly to FIGS. 1 and 2, there is shown a vehicle alignment system 11 of the present invention. Alignment system 11 includes a console 13 suitably mounted on a stand 15 for use by a technician/user 17. Console 13 includes a set of manually operable input keys or switches 19(A–D) and a display 21. Display 21 is preferably a CRT computer monitor type display with a resolution of at least 300×200 pixels, and by way of illustration may have a resolution of 416×288 pixels or higher. It is required that display 21 be capable of displaying digital photographs.

Input keys 19 and display 21 are connected to a microcomputer 22 which functions to control the operation of system 11. Any number of different microcomputers may be used in system 11, depending upon the other requirements of the system. For purposes of the present invention, it is only necessary that microcomputer 22 be capable of use with a CD ROM drive, that it be able to read input switches 19, and that it be able to control display 21.

Alignment system 11 also includes a CD ROM 23 with the appropriate CD ROM drive and interface circuitry (not shown) and suitable alignment sensors 25, both of which are suitably connected to microcomputer 22. It should be appreciated that system 11 functions adequately as a technician's tool without sensors 25. However, it is preferred that sensors 25 be included so that system 11 may be used not only to instruct the technician, but also to measure alignment characteristics. Vehicle alignment apparatus are, of course, well known. See, U.S. Pat. Nos. Re. 33,144 to Hunter et. al., and 4,381,548 to Grossman et al., the disclosures of which are incorporated herein by reference.

System 11 is particularly suited for use by technician 17 in inspecting and adjusting alignment of the suspension of numerous different vehicle models. That is, it preferably provides information for both inspection and adjustment for many different makes and models of vehicles, preferably automobiles and light trucks.

Figure 3:
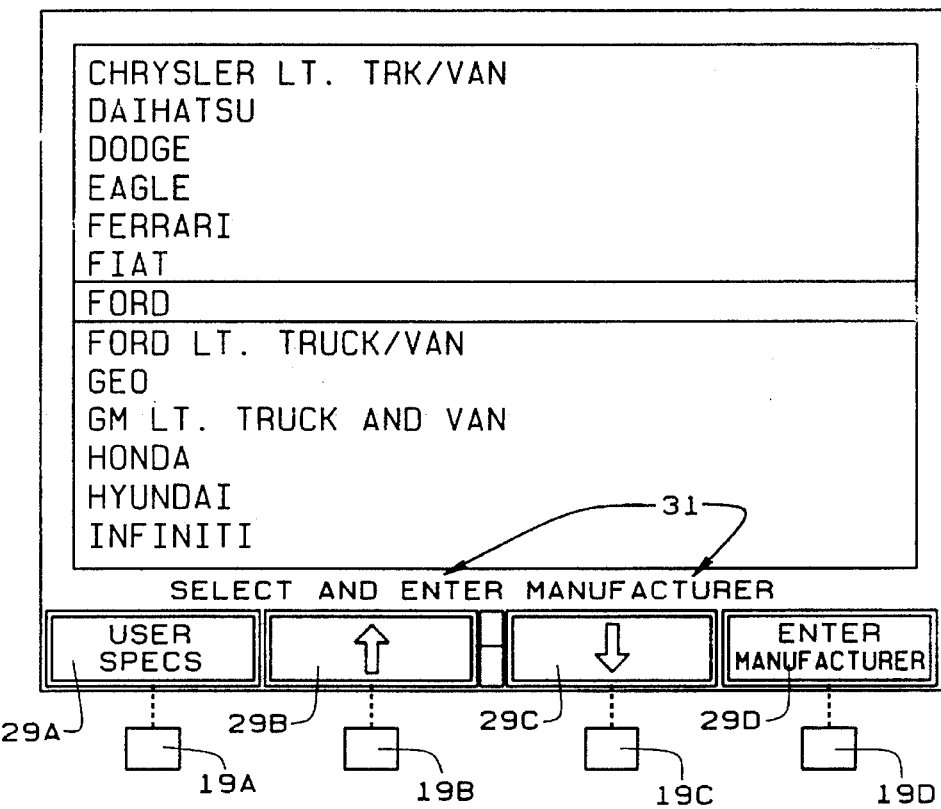
FIG. 3 is a front elevation of a display used by the technician to enter the identity of the vehicle manufacturer into the system of FIG. 1.
Figure 4:
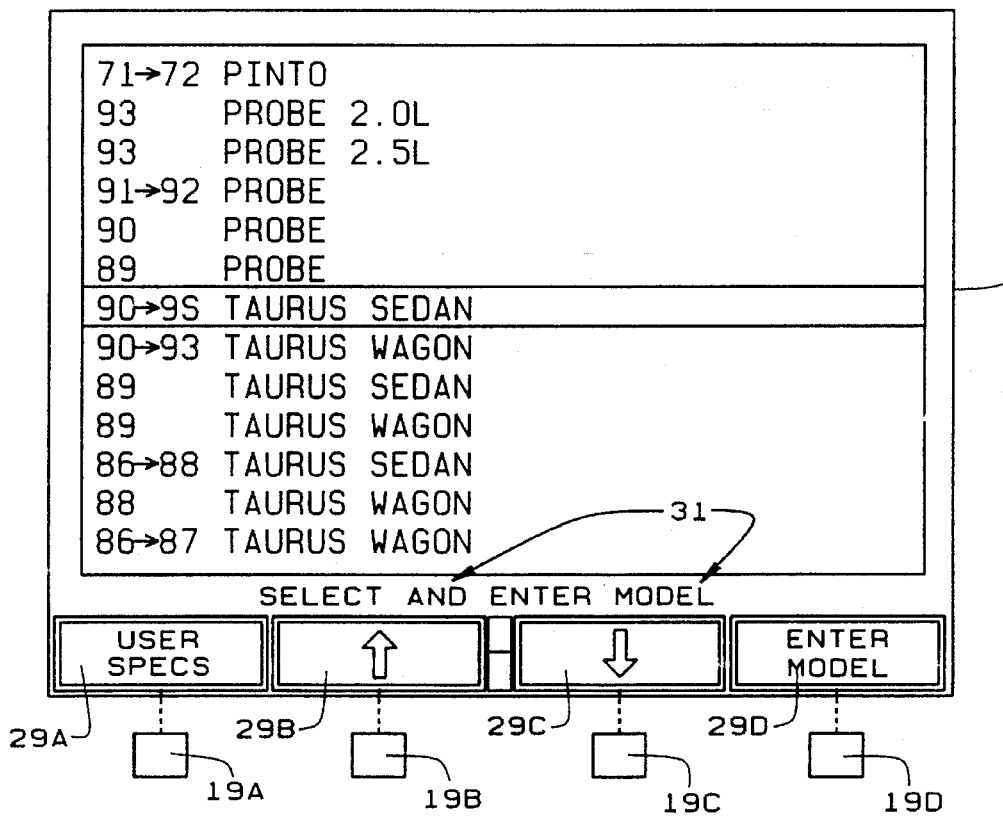
FIG. 4 is a front elevation of a display similar to that of FIG. 3 used to enter the vehicle model into the system of FIG. 1.

The user must instruct system 11 concerning the particular model vehicle to be inspected and/or adjusted. This is done by means of manually operable switches or input keys 19 in conjunction with various lists displayed on display 21, as illustrated in FIGS. 3 and 4. For example, in FIG. 3, microcomputer 22 has caused a make or manufacturer list to be displayed on display 21. Technician 17 uses switches 19B and 19C to scroll up or down respectively in the list to find the desired manufacturer. It should be noted that the majority of display 21 is filled with a portion of the list of manufacturers, while the bottom of display 21 contains four variable function blocks 29A–D, and variable indicia 31 providing instructions to the technician for operation of the keys 19. Function blocks 29A–D are disposed directly over corresponding switches 19A–D and display to the user the function of those switches at that particular time in the program.

Once the desired manufacturer is selected by means of scrolling switches 19B and 19C, the technician uses switch 19D to enter the selected manufacturer for use by microcomputer 22. Upon receipt of an entered manufacturer, microcomputer 22 causes display 21 to replace the display of FIG. 3 with that of FIG. 4. This display is very similar except that it is used in conjunction with switches 19 to enter the desired model of vehicle. For example, for the manufacturer selected from the display of FIG. 3 (Ford), microcomputer 22 causes display 21 to display a list of models for that manufacturer. A portion of that model list is shown in FIG. 4. The technician uses switches 19B and 19C to scroll through the model list until the desired vehicle is reached—in this example, a 90–93 Taurus Sedan. The technician then enters the model selected by means of switch 19D and the microcomputer is thereby informed of the desired model of vehicle for which inspection and/or adjustment is desired.

Figure 5:
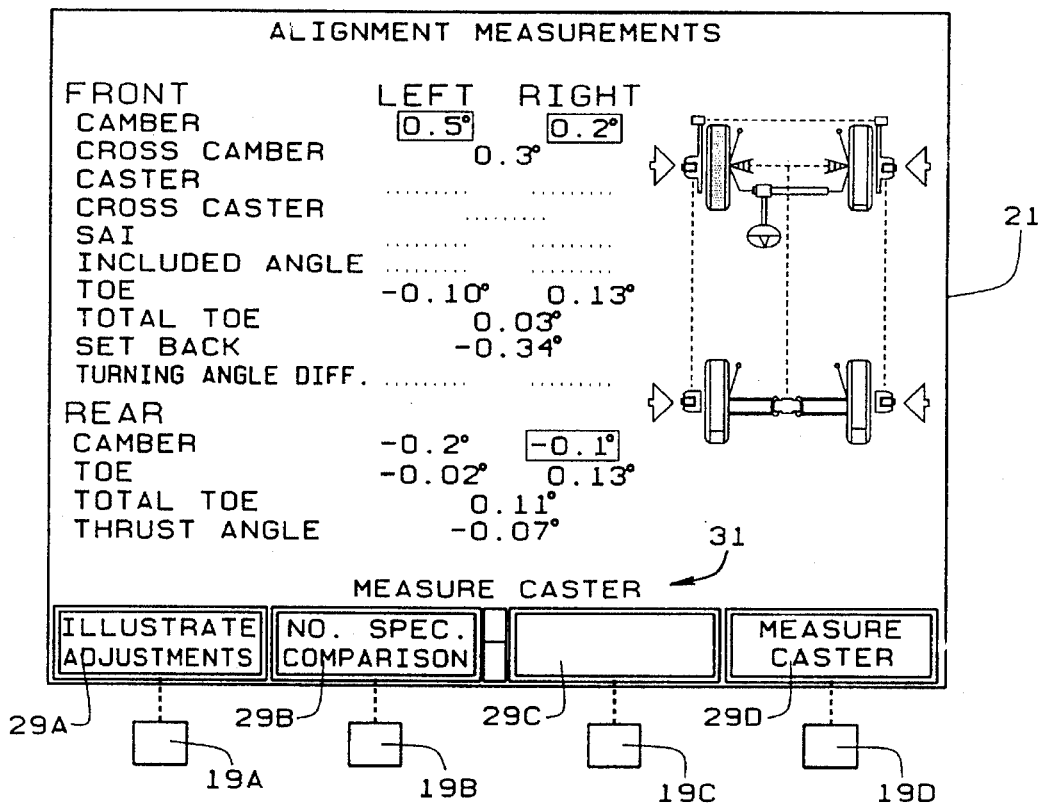
FIG. 5 is a front elevation of a display illustrating measured alignment characteristics for a vehicle using the system of FIG. 1.

FIG. 5 illustrates certain alignment test results obtained by means of sensors 25 in the conventional way. At this point in the alignment process, the technician may desire to adjust the suspension. This process may be facilitated by pressing switch 19A, which at this point in the process directs the microcomputer 22 to illustrate the adjustments.

CD ROM 23 has stored therein a database of over five hundred and preferably over six hundred digital photographs taken of actual vehicles and illustrating suspension and steering parts for those vehicles. More particularly, the photographs are chosen to depict actual wear and adjustment points of different actual vehicle models, and are preferably divided into sets of adjustment photographs and inspection photographs. The digital photographs cover over eighty per cent of the automobiles and light trucks sold in the United States over the past ten years. These digital photographs are taken of a large number of actual vehicle models so that the technician is presented with a digital photograph which is exactly the same as the particular make and model vehicle which is being inspected or adjusted.

The digital photographs are basically instantly available upon pressing switch 19A at the proper time in the process. For example, an access and display time of less than two seconds is achieved. The digital photographs are stored with the above-mentioned resolution in CD ROM 23, and are accessed by microcomputer 22 as needed. The photographs are preferably stored in color (256 colors, for example) to increase the legibility of the photographs for the technician. In those rare cases where an actual photograph is not available for that particular model vehicle, other means such as a technical drawing is displayed on display 21.

Figure 6:
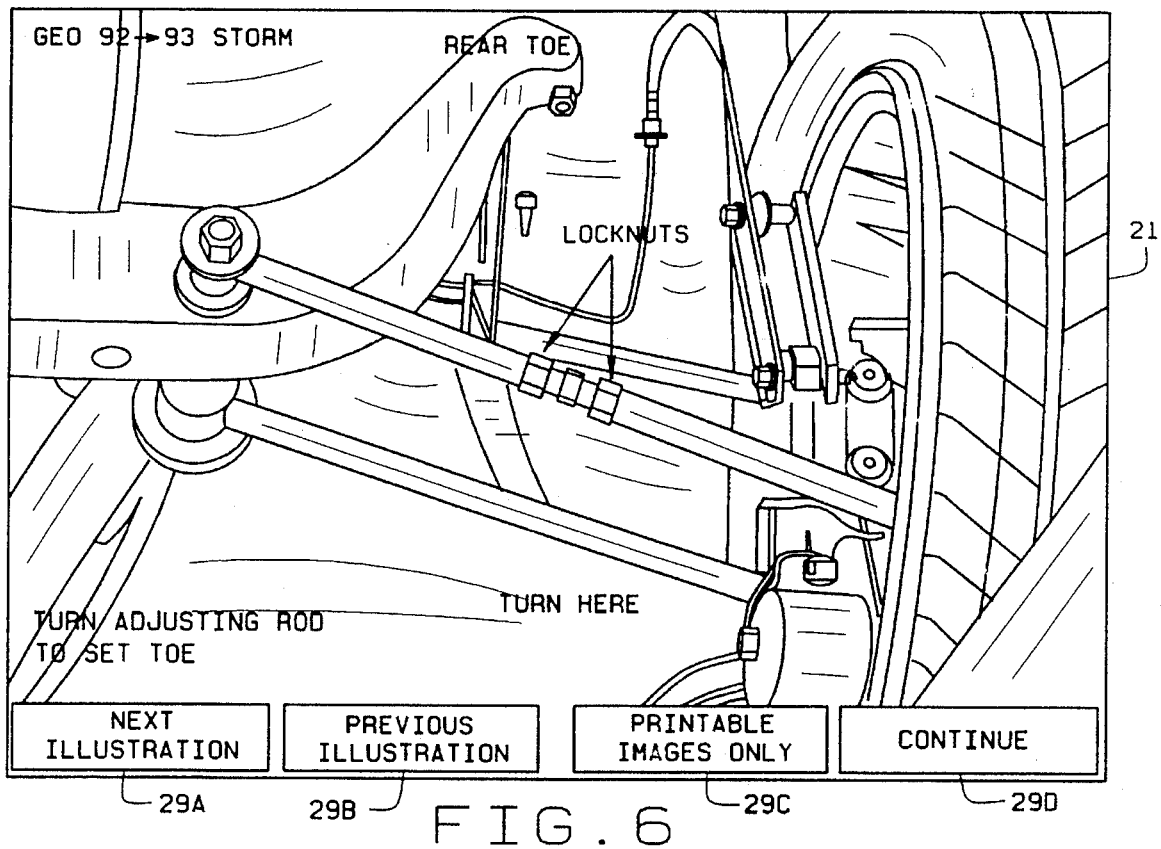
FIGS. 6 and 7 are front elevations of displays illustrating digital photographs of actual vehicle suspensions and steering systems stored in and displayed by the system of FIG. 1.
Figure 7:
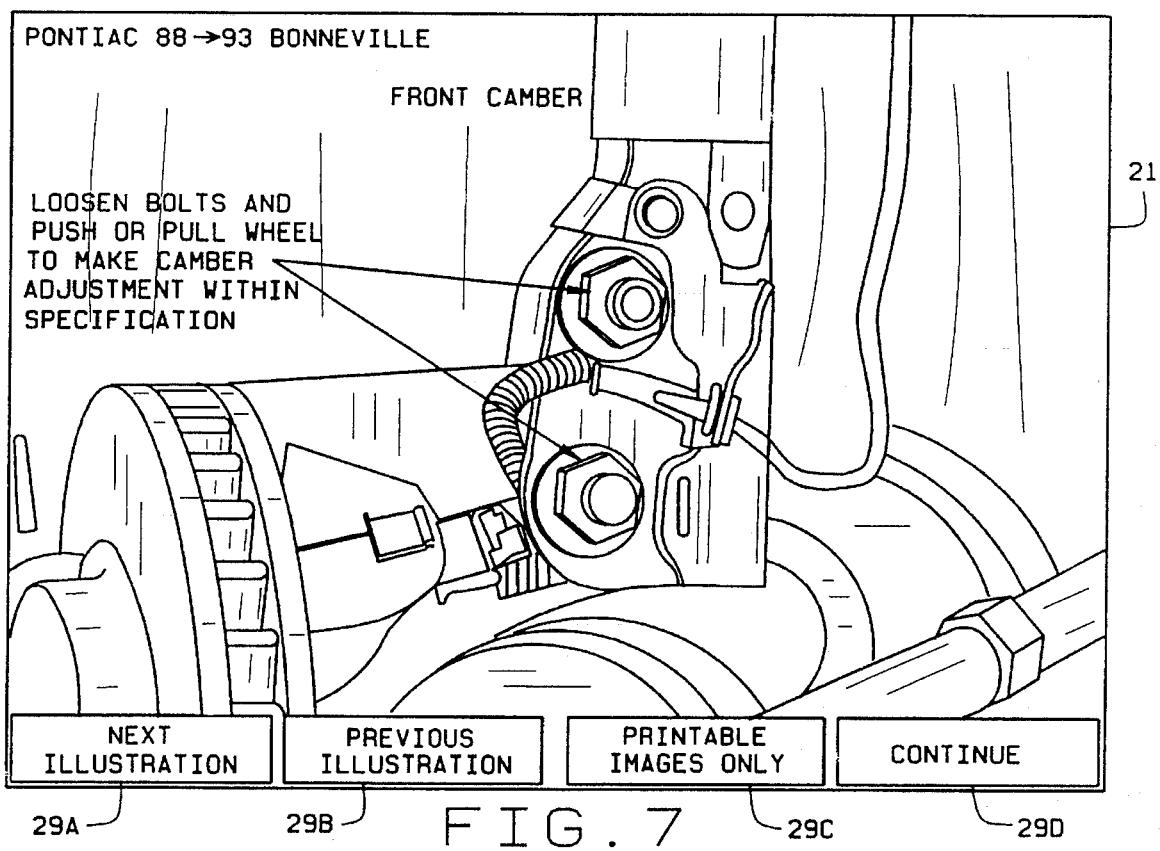

As can be seen in FIGS. 6 and 7, the digital photographs displayed on display 21 have visual indicia superimposed thereon. For example, the adjustment photographs of these FIGS. have visual indicia indicating the make and model of vehicle, the title of the adjustment being illustrated ("Rear Toe" and "Front Camber" in these FIGS.), instructions for performing the adjustment ("Turn adjusting rod to set Toe", "Turn Here", and "Loosen bolts and push or pull wheel to specification" in these FIGS.), arrows pointing to the adjustment members on the photographs, and instructions in function blocks 29A–D for guiding the technician through the plurality of photographs for that particular vehicle. It should be understood that different vehicles have different numbers of photographs stored in CD ROM 23 because of different numbers of adjustment points.

The method of operating alignment apparatus 11 for adjusting the suspensions of numerous different vehicle models therefore is to first select (using switches 19) from a plurality of vehicle models a particular vehicle model having a suspension to be adjusted. The digital photograph of the portion of the suspension of the vehicle model under test which may require adjustment is then displayed on display 21, along with adjustment instructions on the digital photograph. The technician then follows the displayed adjustment instructions to adjust the suspension if necessary.

Figure 8:
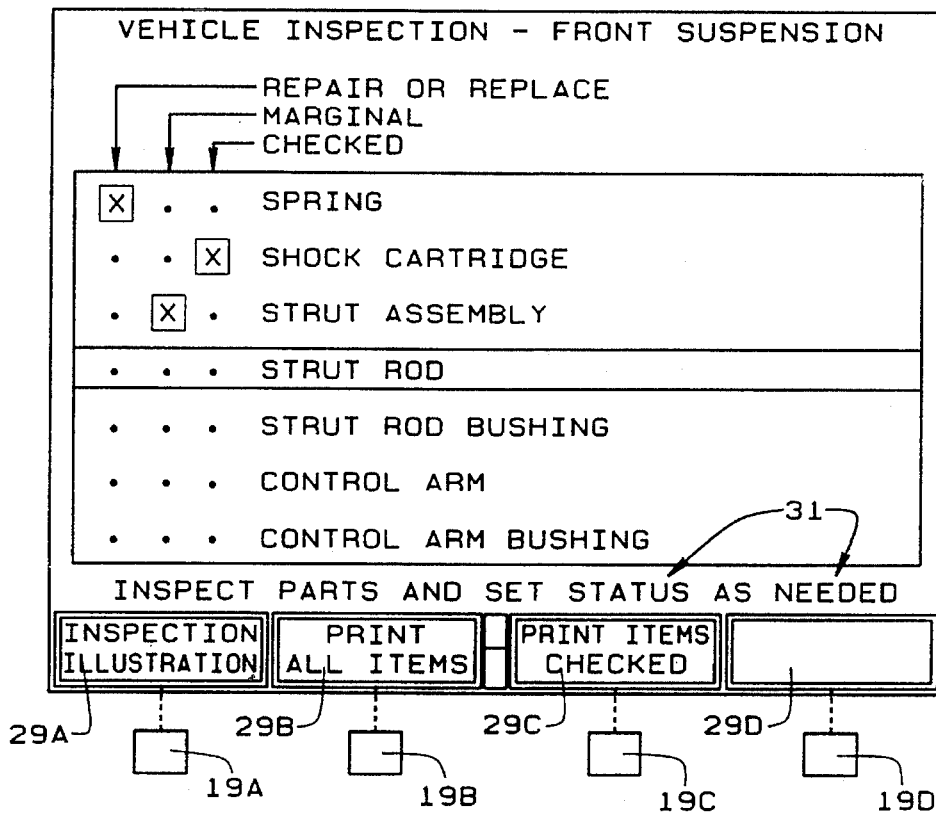
FIG. 8 is a front elevation of a display illustrating an inspection checklist used in the system of FIG. 1.
Figure 9:
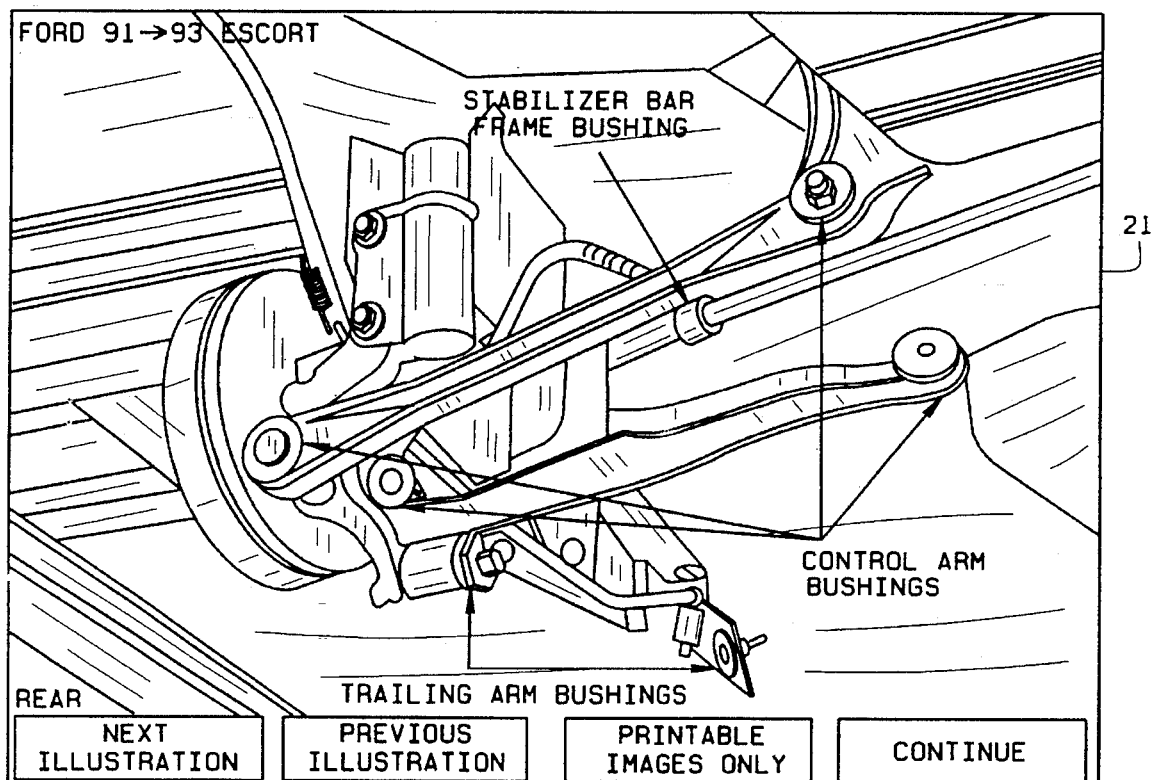
FIGS. 9 and 10 are front elevations of displays illustrating digital photographs of actual vehicle inspection points corresponding to the checklist of FIG. 8, stored in and displayed by the system of FIG. 1.
Figure 10:
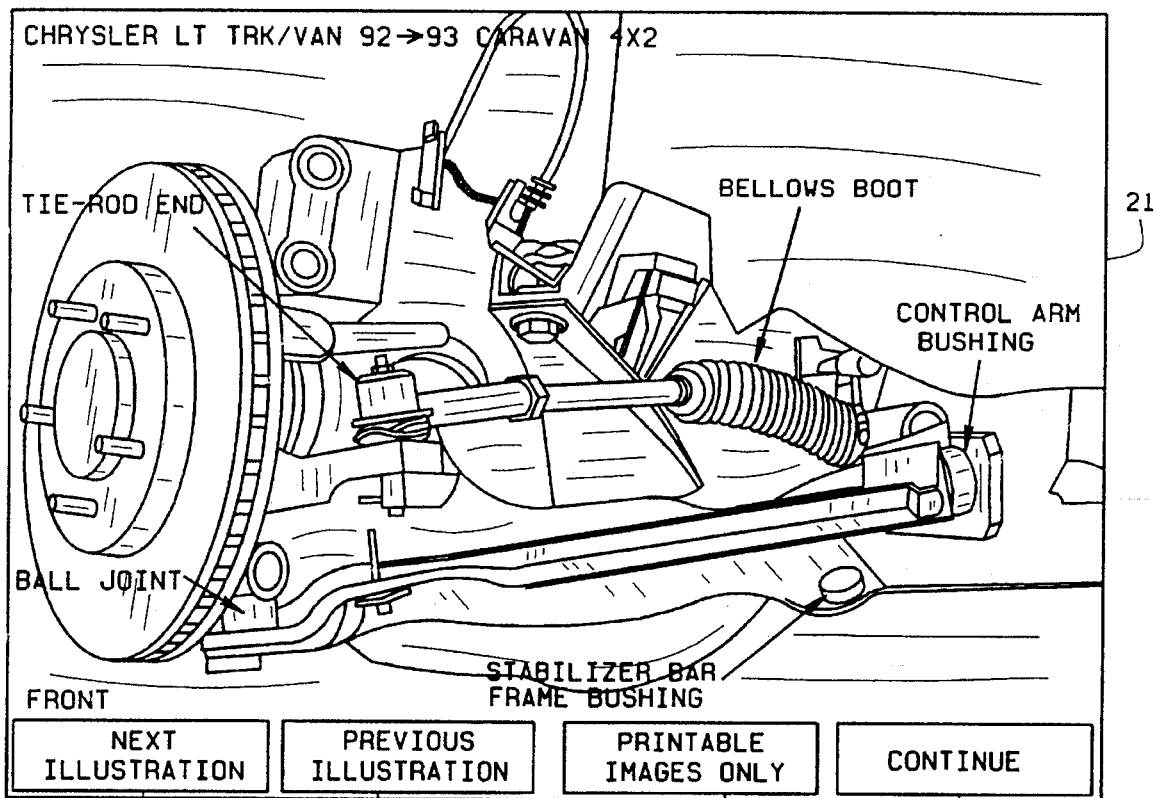

A similar operation is illustrated for inspection of vehicles in FIGS. 8–10. FIG. 8 illustrates an inspection checklist being displayed on display 21 for a particular vehicle make and model previously selected by the technician. The technician may use the checklist (only a part of which is shown on display 21 at any one time) to inspect the wear points on the particular vehicle being examined. For example, on FIG. 8, the springs, shock cartridge, and strut assembly have been inspected and the results entered by the technician. The next item on this screen is the strut rods. By following this list, the technician can perform a thorough inspection of the suspension and steering components of the vehicle.

By pressing switch 19A at this stage in the process, the technician signals the microcomputer 22 to cause the corresponding inspection digital photograph to be displayed on display 21. Two illustrative inspection photographs are shown in FIGS. 9 and 10. These photographs, like the adjustment digital photographs are of the actual vehicle make and model being examined, thereby eliminating guesswork on the part of the technician. They also include visual indicia, such as the make and model of vehicle depicted, the names of the parts to be inspected, and arrows from the part names to the corresponding part to preclude error on the part of the technician.

The method of operating alignment apparatus for inspecting the suspensions of numerous different vehicle models therefore includes the steps of selecting (using switches 19) from a plurality of vehicle models a particular vehicle model to be inspected, displaying as a digital image on display 21 a digital photograph of at least one actual wear point of the actual vehicle model selected, and displaying on the digital photograph visual indicia of a plurality of predetermined inspection points for that portion of the suspension of the selected vehicle model.

In view of the above, it will be seen that the various objects and features of the present invention are achieved and other advantageous results obtained. It will be understood that the various embodiments of the present invention described herein are illustrative only and are not to be taken in a limiting sense.

What is claimed is:

1. A system for facilitating the inspection and alignment of the suspensions of numerous different vehicle models comprising:

manually operable means for selecting a particular vehicle model to be inspected and adjusted;

means for prestoring a number of digital photographs depicting predetermined actual wear and adjustment points for the alignment and suspensions of a plurality of different actual vehicle models;

display means for displaying digital photographs;

controller means responsive to the selection of a particular vehicle model by the selecting means for providing, if available, at least one of the stored digital photographs for that particular vehicle model to the display means for display, said displayed digital photograph depicting at least one of said predetermined wear and adjustment points of the selected vehicle model.

2. The vehicle alignment system as set forth in claim 1 wherein the storing means has stored therein over 500 different digital photographs depicting actual wear and adjustment points of actual vehicle models.

3. The vehicle alignment system as set forth in claim 1 wherein the storing means has stored therein digital photographs depicting actual wear and adjustment points for a majority of the automobiles sold in the United States over a predetermined decade.

4. The vehicle alignment system as set forth in claim 1 wherein the storing means has stored therein a first set of digital photographs for use in vehicle inspection and a second set of digital photographs for use in vehicle adjustment.

5. The vehicle alignment system as set forth in claim 4 wherein the inspection digital photographs have associated therewith visual indicia indicating to the user inspection points for the particular vehicle model suspension being displayed in the photograph.

6. The vehicle alignment system as set forth in claim 5 wherein the visual indicia includes alphanumeric legends and arrows pointing to the particular parts on the digital photograph corresponding to the alphanumeric legends.

7. The vehicle alignment system as set forth in claim 4 wherein the adjustment digital photographs have associated therewith visual indicia indicating to the user adjustment points and instructions for adjusting the particular vehicle model alignment being displayed in the photograph.

8. The vehicle alignment system as set forth in claim 1 wherein the storing means has stored therein a plurality of digital photographs for each of at least some of the particular vehicle models to be tested.

9. The vehicle alignment system as set forth in claim 1 wherein the prestoring means has stored therein at least one such photograph for at least a majority of the automobiles sold in the United States over a predetermined period.

10. The vehicle alignment system as set forth in claim 1 wherein the storing means is a compact disc read only memory.

11. A method of operating alignment apparatus for inspecting the suspensions of numerous different vehicle models comprising the steps of:

selecting from a plurality of vehicle models a particular vehicle model to be inspected;

displaying as a digital image a digital photograph of at least one actual wear point of the suspension of the actual vehicle model selected, said digital photograph being retrieved from a collection of digital photographs;

displaying in connection with said digital image visual indicia of a plurality of predetermined inspection points for that portion of the suspension of the selected vehicle model.

12. The method as set forth in claim 11 wherein the step of displaying the digital image includes accessing and displaying the selected digital image from a CD-ROM digital photograph storage medium.

13. The method as set forth in claim 11 wherein at least one such photograph is stored in the collection of digital photographs for at least a majority of the automobiles sold in the United States over a predetermined period.

14. A method of operating alignment apparatus for adjusting the suspensions of numerous different vehicle models comprising the steps of:

selecting from a plurality of vehicle models a particular vehicle model to be adjusted;

displaying a digital photograph of the portion of the suspension of the particular vehicle model under test which may require adjustment, said digital photograph being retrieved from a collection of digital photographs;

displaying adjustment instructions in connection with the digital photograph; and following the displayed adjustment instructions to adjust the suspension of the vehicle if necessary.

15. The method as set forth in claim 14 wherein the step of displaying the digital photograph includes accessing and displaying the selected digital photograph from a CD-ROM digital photograph storage medium.

16. The method as set forth in claim 14 wherein said collection includes at least one photograph depicting an actual portion of the suspension for each of at least a majority of the automobiles sold in the United States over a predetermined period.

17. A system for facilitating the inspection and alignment of the suspensions of numerous different vehicle models comprising:

manually operable means for selecting a particular vehicle model to be inspected and adjusted;

means for prestoring a number of digital photographs depicting predetermined actual wear and adjustment points for the alignment and suspensions of a plurality of different actual vehicle models;

display means for displaying digital photographs;

controller means responsive to the selection of a particular vehicle model by the selecting means for providing, if available, at least one of the stored digital photographs for that particular vehicle model to the display means for display, said displayed digital photograph depicting at least one of said predetermined wear and adjustment points of the selected vehicle model;

at least some of said digital photographs having associated therewith visual indicia indicating to the user inspection points for the particular vehicle model being depicted and at least some of said digital photographs having associated therewith visual indicia indicating to the user adjustment points and instructions for adjusting the particular vehicle model being depicted.

* * * * *